(12) United States Patent
Sato

(10) Patent No.: US 7,940,394 B2
(45) Date of Patent: May 10, 2011

(54) COLOR DISTRIBUTION MEASURING OPTICAL SYSTEM, COLOR DISTRIBUTION MEASURING APPARATUS, AND COLOR DISTRIBUTION MEASURING METHOD

(75) Inventor: Masatoshi Sato, Machida (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/712,751

(22) Filed: Feb. 25, 2010

(65) Prior Publication Data

US 2010/0149536 A1 Jun. 17, 2010

Related U.S. Application Data

(63) Continuation of application No. PCT/JP2008/064936, filed on Aug. 21, 2008.

(30) Foreign Application Priority Data

Aug. 27, 2007 (JP) ................................. 2007-219390

(51) Int. Cl.
*G01N 21/25* (2006.01)
(52) U.S. Cl. ........................................ 356/419; 356/416
(58) Field of Classification Search .................. 356/416, 356/419
See application file for complete search history.

(56) References Cited

U.S. PATENT DOCUMENTS

| 5,214,494 | A | | 5/1993 | Inaba et al. |
| 5,272,518 | A | * | 12/1993 | Vincent ......................... 356/405 |
| 7,280,214 | B2 | * | 10/2007 | DiFoggio et al. .............. 356/419 |

FOREIGN PATENT DOCUMENTS

| JP | A-4-113235 | 4/1992 |
| JP | A-2002-310800 | 10/2002 |

OTHER PUBLICATIONS

Engelhardt et al.; "Optimum color filters for CCD digital cameras;" *Applied Optics*; 1993; pp. 3015-3023; vol. 32; No. 16.
International Search Report for International Application No. PCT/JP2008/064936, issued Sep. 22, 2008.

* cited by examiner

*Primary Examiner* — L. G. Lauchman
(74) *Attorney, Agent, or Firm* — Oliff & Berridge, PLC

(57) ABSTRACT

A color distribution measuring optical system generates an image of an object to be measured via an imaging optical system and a color matching function filter. The color matching function filter is an optical multilayer film filter, and the angle of arrangement of the color matching function filter can be changed, with respect to an optical axis of the imaging optical system, depending on the numerical aperture of the imaging optical system by a tilt angle changing device. Various imaging optical systems can be used even when the optical multilayer filter is used.

12 Claims, 14 Drawing Sheets

Fig. 5

| No. | material | d(nm) |
|---|---|---|
| – | BK7 | – |
| 1 | $Nb_2O_5$ | 28.63 |
| 2 | $SiO_2$ | 41.54 |
| 3 | $Nb_2O_5$ | 49.08 |
| 4 | $SiO_2$ | 36.44 |
| 5 | $Nb_2O_5$ | 27.37 |
| 6 | $SiO_2$ | 69.61 |
| 7 | $Nb_2O_5$ | 23.49 |
| 8 | $SiO_2$ | 76.27 |
| 9 | $Nb_2O_5$ | 24.09 |
| 10 | $SiO_2$ | 51.42 |
| 11 | $Nb_2O_5$ | 28.76 |
| 12 | $SiO_2$ | 75.87 |
| 13 | $Nb_2O_5$ | 34.98 |
| 14 | $SiO_2$ | 68.75 |
| 15 | $Nb_2O_5$ | 41.19 |
| 16 | $SiO_2$ | 56.79 |
| 17 | $Nb_2O_5$ | 30.61 |
| 18 | $SiO_2$ | 50.39 |
| 19 | $Nb_2O_5$ | 38.45 |
| 20 | $SiO_2$ | 72.21 |
| 21 | $Nb_2O_5$ | 32.13 |
| 22 | $SiO_2$ | 112.54 |
| 23 | $Nb_2O_5$ | 63.29 |
| 24 | $SiO_2$ | 29.41 |
| 25 | $Nb_2O_5$ | 55.65 |

| No. | material | d(nm) |
|---|---|---|
| 26 | $SiO_2$ | 142.35 |
| 27 | $Nb_2O_5$ | 32.91 |
| 28 | $SiO_2$ | 103.46 |
| 29 | $Nb_2O_5$ | 21.04 |
| 30 | $SiO_2$ | 85.45 |
| 31 | $Nb_2O_5$ | 75.1 |
| 32 | $SiO_2$ | 123.63 |
| 33 | $Nb_2O_5$ | 88.26 |
| 34 | $SiO_2$ | 139.74 |
| 35 | $Nb_2O_5$ | 73.04 |
| 36 | $SiO_2$ | 132.15 |
| 37 | $Nb_2O_5$ | 76.57 |
| 38 | $SiO_2$ | 140.62 |
| 39 | $Nb_2O_5$ | 67.9 |
| 40 | $SiO_2$ | 130.41 |
| 41 | $Nb_2O_5$ | 80.54 |
| 42 | $SiO_2$ | 148.07 |
| 43 | $Nb_2O_5$ | 77.81 |
| 44 | $SiO_2$ | 135.89 |
| 45 | $Nb_2O_5$ | 93.39 |
| 46 | $SiO_2$ | 145 |
| 47 | $Nb_2O_5$ | 79.47 |
| 48 | $SiO_2$ | 78.44 |
| – | air | – |

Fig. 6

| No. | material | d(nm) |
|---|---|---|
| – | BK7 | – |
| 1 | $Nb_2O_5$ | 30 |
| 2 | $SiO_2$ | 30 |
| 3 | $Nb_2O_5$ | 57.22 |
| 4 | $SiO_2$ | 35.52 |
| 5 | $Nb_2O_5$ | 30.21 |
| 6 | $SiO_2$ | 50.03 |
| 7 | $Nb_2O_5$ | 47.59 |
| 8 | $SiO_2$ | 36.27 |
| 9 | $Nb_2O_5$ | 45.76 |
| 10 | $SiO_2$ | 67.97 |
| 11 | $Nb_2O_5$ | 30.73 |
| 12 | $SiO_2$ | 43.6 |
| 13 | $Nb_2O_5$ | 52.69 |
| 14 | $SiO_2$ | 40.02 |
| 15 | $Nb_2O_5$ | 32.8 |
| 16 | $SiO_2$ | 67.45 |
| 17 | $Nb_2O_5$ | 50.45 |
| 18 | $SiO_2$ | 71.15 |
| 19 | $Nb_2O_5$ | 34.41 |
| 20 | $SiO_2$ | 73.97 |
| 21 | $Nb_2O_5$ | 56.71 |
| 22 | $SiO_2$ | 64.24 |
| 23 | $Nb_2O_5$ | 35.3 |
| 24 | $SiO_2$ | 111.76 |
| 25 | $Nb_2O_5$ | 34.69 |

| No. | material | d(nm) |
|---|---|---|
| 26 | $SiO_2$ | 35.87 |
| 27 | $Nb_2O_5$ | 51.34 |
| 28 | $SiO_2$ | 44.22 |
| 29 | $Nb_2O_5$ | 30 |
| 30 | $SiO_2$ | 30 |
| 31 | $Nb_2O_5$ | 34.24 |
| 32 | $SiO_2$ | 158.5 |
| 33 | $Nb_2O_5$ | 73.01 |
| 34 | $SiO_2$ | 89.12 |
| 35 | $Nb_2O_5$ | 95.36 |
| 36 | $SiO_2$ | 107.74 |
| 37 | $Nb_2O_5$ | 80.34 |
| 38 | $SiO_2$ | 114.49 |
| 39 | $Nb_2O_5$ | 84.65 |
| 40 | $SiO_2$ | 130.58 |
| 41 | $Nb_2O_5$ | 88.45 |
| 42 | $SiO_2$ | 134.97 |
| 43 | $Nb_2O_5$ | 82.57 |
| 44 | $SiO_2$ | 144.08 |
| 45 | $Nb_2O_5$ | 79.31 |
| 46 | $SiO_2$ | 151.89 |
| 47 | $Nb_2O_5$ | 85.18 |
| 48 | $SiO_2$ | 76.85 |
| – | air | – |

Fig. 7

| No. | material | d(nm) |
|---|---|---|
| -- | BK7 | -- |
| 1 | $Nb_2O_5$ | 89.01 |
| 2 | $SiO_2$ | 59.47 |
| 3 | $Nb_2O_5$ | 88.59 |
| 4 | $SiO_2$ | 62.28 |
| 5 | $Nb_2O_5$ | 80.66 |
| 6 | $SiO_2$ | 70.15 |
| 7 | $Nb_2O_5$ | 74.12 |
| 8 | $SiO_2$ | 85.97 |
| 9 | $Nb_2O_5$ | 75.21 |
| 10 | $SiO_2$ | 54.22 |
| 11 | $Nb_2O_5$ | 88.13 |
| 12 | $SiO_2$ | 43.49 |
| 13 | $Nb_2O_5$ | 66.94 |
| 14 | $SiO_2$ | 108.84 |
| 15 | $Nb_2O_5$ | 71.19 |
| 16 | $SiO_2$ | 59.71 |
| 17 | $Nb_2O_5$ | 92.42 |
| 18 | $SiO_2$ | 55.37 |
| 19 | $Nb_2O_5$ | 103.29 |
| 20 | $SiO_2$ | 37.76 |
| 21 | $Nb_2O_5$ | 100.06 |
| 22 | $SiO_2$ | 92 |
| 23 | $Nb_2O_5$ | 82.88 |
| 24 | $SiO_2$ | 86.7 |
| 25 | $Nb_2O_5$ | 110.38 |
| 26 | $SiO_2$ | 24.71 |
| 27 | $Nb_2O_5$ | 118.8 |
| 28 | $SiO_2$ | 53.86 |
| 29 | $Nb_2O_5$ | 107.38 |
| 30 | $SiO_2$ | 32.86 |

| No. | material | d(nm) |
|---|---|---|
| 31 | $Nb_2O_5$ | 126.51 |
| 32 | $SiO_2$ | 43.63 |
| 33 | $Nb_2O_5$ | 93.63 |
| 34 | $SiO_2$ | 92.91 |
| 35 | $Nb_2O_5$ | 91.13 |
| 36 | $SiO_2$ | 121.55 |
| 37 | $Nb_2O_5$ | 80.05 |
| 38 | $SiO_2$ | 106.24 |
| 39 | $Nb_2O_5$ | 88.3 |
| 40 | $SiO_2$ | 122.41 |
| 41 | $Nb_2O_5$ | 85.72 |
| 42 | $SiO_2$ | 96.08 |
| 43 | $Nb_2O_5$ | 102.54 |
| 44 | $SiO_2$ | 92.57 |
| 45 | $Nb_2O_5$ | 101.25 |
| 46 | $SiO_2$ | 92.4 |
| 47 | $Nb_2O_5$ | 107.88 |
| 48 | $SiO_2$ | 94.27 |
| 49 | $Nb_2O_5$ | 101.16 |
| 50 | $SiO_2$ | 93.79 |
| 51 | $Nb_2O_5$ | 89.54 |
| 52 | $SiO_2$ | 42.29 |
| -- | air | -- |

COLOR DISTRIBUTION MEASURING OPTICAL SYSTEM, COLOR DISTRIBUTION MEASURING APPARATUS, AND COLOR DISTRIBUTION MEASURING METHOD

CROSS-REFERENCE

This application is a Continuation Application of International Application No. PCT/JP2008/064936 which was filed on Aug. 21, 2008 claiming the conventional priority of Japanese patent Application No. 2007-219390 filed on Aug. 27, 2007.

BACKGROUND OF THE INVENTION

1. Field of the Invention

The present invention relates to a color distribution measuring optical system, a color distribution measuring apparatus, and a color distribution measuring method which are applicable to evaluate the color distribution of displays, projectors, backlights, etc.

2. Description of the Related Art

In order to evaluate the color of a measurement objective (object to be measured) having a certain areal size such as a display, a projector, a backlight or the like, a system, in which color data of respective points of the measurement objective is obtained collectively, is more appropriate than a system in which the color data of respective points of the measurement objective is obtained successively or sequentially (see, for example, Japanese Patent Application Laid-open No. 2006-177812). When the visual effect, which is to be exerted on the human, is evaluated, it is possible to apply not only the spectral system in which the luminance is measured at respective wavelengths but also the tristimulus value direct reading system in which the tristimulus values are directly measured (see, for example, Japanese Patent Application Laid-open No. 2002-310800).

Therefore, it is preferable for the color evaluation to use a color distribution measuring apparatus of the tristimulus value direct reading system in which the measurement objective is photographed or imaged via an imaging optical system and a color matching function filter. In particular, the imaging optical system forms an image of the measurement objective on an image pickup element or device. The color matching function filter is a filter (x-filter, y-filter, z-filter) which is manufactured so that the shape of the curve of the spectral transmission characteristic is same as the shape of the curve of the color matching function of a normalized color system (CIE color system).

Usually, a plurality of colored glasses, which are stuck and laminated with each other, are used for the color matching function filter. However, it is difficult to control the thickness of the colored glass, and hence the manufacturing error is large. Therefore, the manufacturing cost tends to be expensive. Further, it is difficult to allow the x-filter, the y-filter, and the z-filter to have the same thickness. Therefore, a problem tends to be caused such that the measurement accuracy differs depending on the components of the tristimulus values.

In view of the above, in recent years, an investigation is started to use an optical multilayer film filter, instead of the colored glasses or stained glasses. The optical multilayer film filter is obtained by staking a plurality of dielectric multilayer films having different properties. On condition that the film arrangement or the film construction thereof is appropriately designed, the manufacturing error is small. Therefore, it is possible to suppress the manufacturing cost. Further, it is possible to allow the x-filter, the y-filter, and the z-filter to have a substantially same thickness. Therefore, the problem is not caused, which would be otherwise caused such that the measurement accuracy differs depending on the components of the tristimulus values.

SUMMARY OF THE INVENTION

However, the spectral transmission characteristic of the optical multilayer film filter has the strong angle dependency as compared with the spectral transmission characteristic of the colored glass. Therefore, if the angle of incidence (spread angle) of the light flux of a measuring light (measuring light beam) with respect to the filter differs, the determined spectral transmission characteristic differs as well. Therefore, if the imaging optical system is exchanged for one having a different F number depending on the measurement objective, or if the aperture diaphragm of the imaging optical system is regulated, then the spectral transmission characteristic is changed, and the measurement cannot be performed, or the measurement accuracy is lowered. Therefore, the optical multilayer film filter is not suitable for such a case that the color distribution is measured by using various imaging optical systems.

In view of the above, an object of the present invention is to provide a color distribution measuring optical system and a color distribution measuring apparatus which make it possible to use various imaging optical systems although an optical multilayer film filter is used.

Another object of the present invention is to provide a color distribution measuring method which makes it possible to perform the measurement highly accurately by using various imaging optical systems although an optical multilayer film filter is used.

According to a first aspect of the present invention, there is provided a color distribution measuring optical system which measures a color distribution of a measurement objective via an imaging optical system, the optical system comprising a color matching function filter which is an optical multilayer film filter; and a changing device which changes an angle of arrangement of the color matching function filter with respect to an optical axis of the imaging optical system. The color distribution measuring optical system can be regarded also as a color matching function filter provided with the changing device which changes the angle of arrangement with respect to the optical axis of the imaging optical system.

The changing device of the color distribution measuring optical system may change the angle of arrangement of the color matching function filter depending on an image side numerical aperture of the imaging optical system.

The changing device of the color distribution measuring optical system in relation to any one of the features described above may change the angle of arrangement of the color matching function filter in response to an instruction from an user.

The imaging optical system may be an optical system which is telecentric on an image side. It is not necessarily indispensable that the color distribution measuring optical system of the present invention is provided with the imaging optical system. However, the color distribution measuring optical system of the present invention may be provided with the imaging optical system.

The color matching function filter may be designed so that a spectral transmission characteristic of a CIE color matching function curve is obtained when an angle, which is formed by the optical axis of the imaging optical system and a normal line of the color matching function filter, is 0° and an image side numerical aperture of the imaging optical system is maximum.

According to a second aspect of the present invention, there is provided a color distribution measuring apparatus comprising the color distribution measuring optical system of the present invention; and a signal generating device which generates color distribution data of the measurement objective based on a luminance distribution of an image generated by the color distribution measuring optical system.

According to a third aspect of the present invention, there is provided a color distribution measuring apparatus which measures a color distribution of an objective, the color distribution measuring apparatus comprising an imaging optical system; a color matching function filter which has an optical multilayer film; a tilt angle regulating device which regulates a tilt angle of the optical multilayer film with respect to an optical axis of the imaging optical system; and a detector which detects an image formed via the imaging optical system and the color matching function filter. The color distribution measuring apparatus of the present invention may further comprise an aperture diaphragm which regulates an image side numerical aperture of the imaging optical system. The color distribution measuring apparatus of the present invention may further comprise a detector which detects the image side numerical aperture. The tilt angle regulating device may regulate the tilt angle based on the image side numerical aperture detected by the detector. The tilt angle regulating device may increase the tilt angle more greatly as the detected image side numerical aperture becomes larger.

According to a fourth aspect of the present invention, there is provided a color distribution measuring method for measuring a color distribution of a measurement objective based on a luminance distribution of an image of the measurement objective, the color distribution measuring method comprising arranging a color matching function filter having an optical multilayer film on an image side of an imaging optical system; regulating an angle of arrangement of the color matching function filter with respect to an optical axis of the imaging optical system depending on an image side numerical aperture of the imaging optical system; and detecting an image of the measurement objective via the imaging optical system and the color matching function filter in which the angle of arrangement is regulated. The color distribution measuring method of the present invention may further comprise detecting the image side numerical aperture of the imaging optical system; and the angle of arrangement of the color matching function filter may be previously determined with respect to the optical axis of the imaging optical system in relation to a different value of the image side numerical aperture of the imaging optical system. The color distribution measuring method of the present invention may further comprise regulating the image side numerical aperture of the imaging optical system depending on the measurement objective.

According to the present invention, the color distribution measuring optical system and the color distribution measuring apparatus are realized, which make it possible to use various imaging optical systems, although the optical multilayer film filter is used. The color distribution measuring apparatus of the present invention can detect or sense the difference in the numerical aperture of the imaging optical system to automatically regulate the optical multilayer film filter depending thereon. Therefore, even when the imaging optical system or the numerical aperture thereof is changed, it is possible to realize a quick and correct color distribution measurement.

According to the present invention, the color distribution measuring method is realized, which makes it possible to perform the measurement highly accurately by using various imaging optical systems, although the optical multilayer film filter is used.

BRIEF DESCRIPTION OF THE DRAWINGS

FIG. 5 shows a film construction of an optical multilayer film of an x-filter 32x.

FIG. 6 shows a film construction of an optical multilayer film of a y-filter 32y.

FIG. 7 shows a film construction of an optical multilayer film of a z-filter 32z.

DESCRIPTION OF THE PREFERRED EMBODIMENTS OF THE INVENTION

First Embodiment

A color distribution measuring apparatus according to a first embodiment will be explained below.

Figure 1:
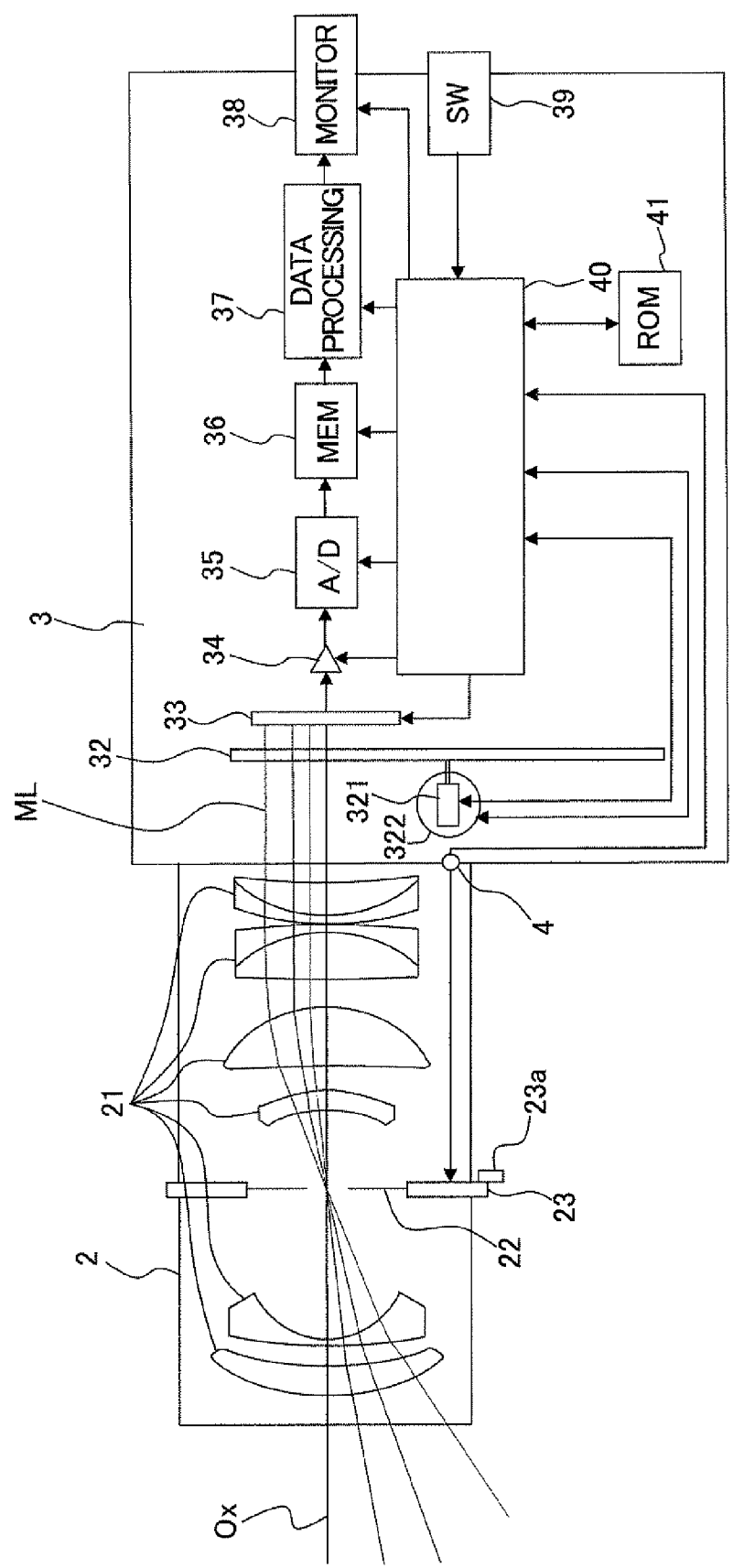
FIG. 1 shows an overall construction of a color distribution measuring apparatus.

At first, an explanation will be made about the construction of the color distribution measuring apparatus. FIG. 1 shows the overall construction of the color distribution measuring apparatus. As shown in FIG. 1, the color distribution measuring apparatus includes a body 3 of the apparatus (apparatus body 3) and a lens unit (imaging optical system) 2. The lens unit 2 is attached or installed exchangeably with respect to the apparatus body 3. Upon the installation, the lens unit 2 is electrically connected to the apparatus body 3 via an electrical contact 4. A measuring light (measuring light beam) from a measurement objective comes into the lens unit 2.

The lens unit 2 is provided with a measuring lens 21, an aperture diaphragm 22, a diaphragm ring 23, etc. When a user operates and rotationally moves the diaphragm ring 23, the aperture diameter of the aperture diaphragm 22 is changed. The diaphragm ring 23 is provided with a sensor 23a which detects or senses the aperture diameter or the position of rotational movement. In this case, it is assumed that the open F value (F number) of the measuring lens 21 is F 1.4. The F value of the measuring lens 21 is switched or changed over in three ways into F 1.4, F 2.0, and F 3.5 in accordance with the switching or changeover of the diameter of the aperture diaphragm 22.

The apparatus body 3 is provided with a rotary type holder (turret) 32 installed with color matching function filters (described later on), a stepping motor 321, a stepping motor 322, an image pickup element or device 33 such as CCD or the like, an amplifier 34, an A/D conversion circuit 35, an image memory 36, a data processing circuit 37, a monitor 38, a switch 39, CPU 40, ROM 41, and the like.

It is also allowable that the monitor 38, the switch 39, etc. are not provided on the apparatus body 3. However, in this case, a connection terminal (a USB connection terminal, etc.) which is to be connected to an external computer is provided for the apparatus body 3. It is also allowable to utilize CPU and ROM of the external computer.

An imaging light flux, which exits from the measurement objective and which passes through the lens unit 2, and the imaging light flux forms, via the color matching function filter installed to the turret 32, an image of the measurement objective on the image pickup element 33. The image is photoelectrically converted by the image pickup element 33 to generate an image signal. The image signal is amplified by the amplifier 34, and then the image signal is converted by the A/D conversion circuit 35 into the digital data which is incorporated into the image memory 36 and which is further processed by the data processing circuit 37. The data after the processing is displayed on the monitor 38.

ROM 41 stores an operation program for CPU 40. CPU 40 controls the respective components in accordance with the operation program. Further, ROM 41 previously stores an information about the tilt angle (0°, 10°, 13.5°) appropriate for each of a plurality of F value (F 1.4, F 2.0, F 3.5) set for the measuring lens 21 (details of the tilt angle will be described later on) together with the operation program. The information is used in the operation of CPU 40 as described later on.

The switch 39 is a switch which can be operated by the user. The switch 39 feeds a signal corresponding to the operation to CPU 40. CPU 40 recognizes instruction (measurement instruction, etc.) from the user in accordance with the signal. Further, CPU 40 is also capable of detecting the F value of the measuring lens 21 accommodated in the lens unit 2 via the electrical contact 4. The F value may be directly detected based on an information about the position of rotational movement obtained from the rotational movement position (aperture diameter) sensor 23a for the diaphragm ring 23. The F value may be detected indirectly via unillustrated lens CPU provided for the lens unit 2.

In this case, the measuring lens 21 is an imaging optical system which is telecentric on the image side. In other words, the optical system of the measuring lens 21, which is disposed on the image side of or with respect to the aperture diaphragm 22, has the front side focus position which is coincident with the diaphragm surface or diaphragm plane. Therefore, the main light beam of the collective light flux, which is included in the imaging light flux described above and which is directed toward each of the points of the image pickup element 33, is parallel when the main light beam exits from the measuring lens 21. Four light beams depicted in FIG. 1 are the main light beams of the respective collective light fluxes which exit from four representative points of the measurement objective and which are directed toward mutually different four points of the image pickup element 33.

Figure 2:
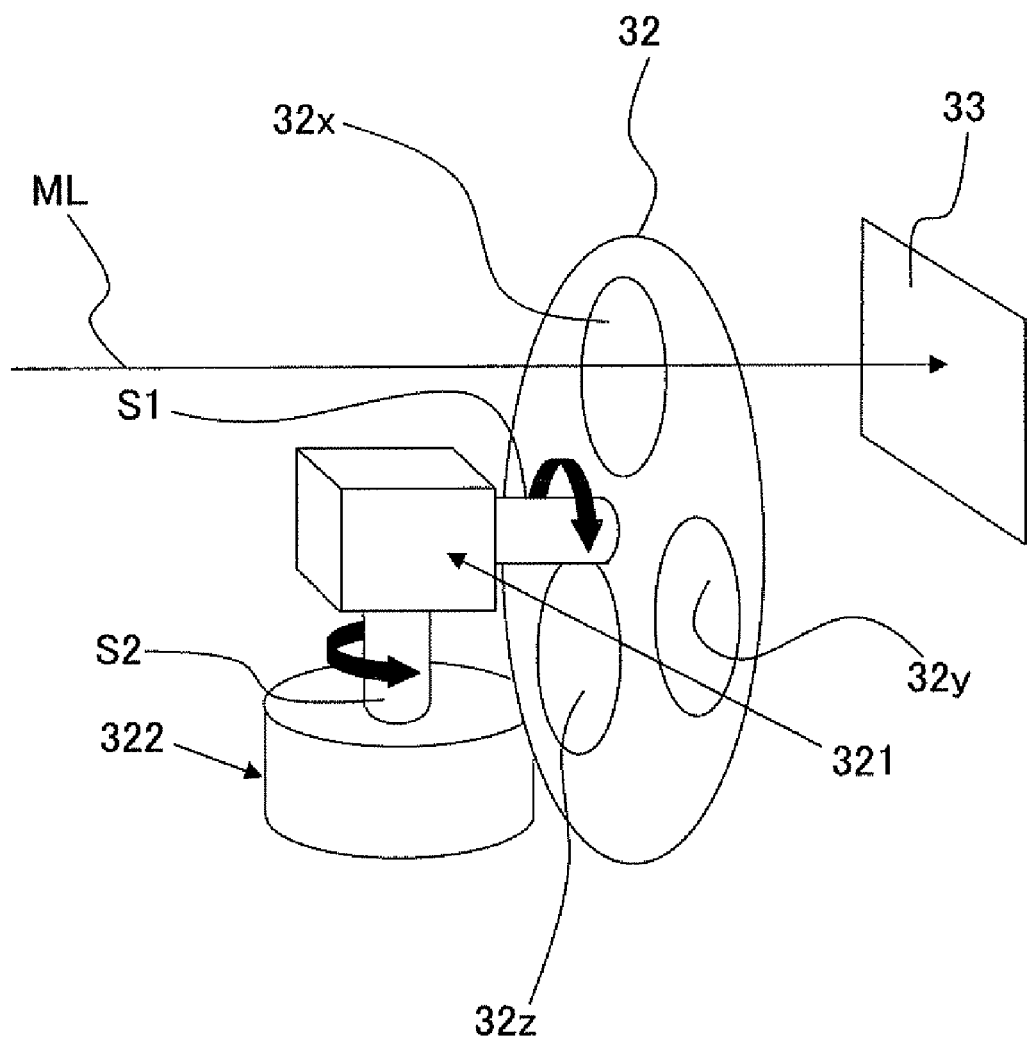
FIG. 2 illustrates a turret 32 and surroundings thereof.

FIG. 2 illustrates the turret 32 and surroundings thereof. As shown in FIG. 2, an x-filter 32x, a y-filter 32y, and a z-filter 32z, which are provided as color matching function filters, are installed or attached to the turret 32. The stepping motor 321 is connected to a rotary shaft S1 of the turret 32. When the stepping motor 321 is driven, the turret 32 is rotated. With this, the color matching function filter, which is to be inserted into the optical path of the measuring lens 21, is switched or changed over among the x-filter 32x, the y-filter 32y, and the z-filter 32z. In the following description, the stepping motor 321 is referred to as "switching motor 321".

The entire switching motor 321 is rotatably supported by a rotary shaft S2 which is parallel to the filter surface. The stepping motor 322 (tilt angle changing device) is connected to the rotary shaft S2. When the stepping motor 322 is driven, the turret 32 is rotated about the center of the rotary shaft S2. The color matching function filter (x-filter 32x in FIG. 2) is arranged on the optical path of a light (light beam) ML exiting from the measuring lens 21 (or on an optical axis Ox of the measuring lens 21). Therefore, when the turret 32 is rotated, the angle of the color matching function filter 32x, which is formed with respect to the optical axis Ox of the measuring lens 21, is also changed.

Figure 3A:
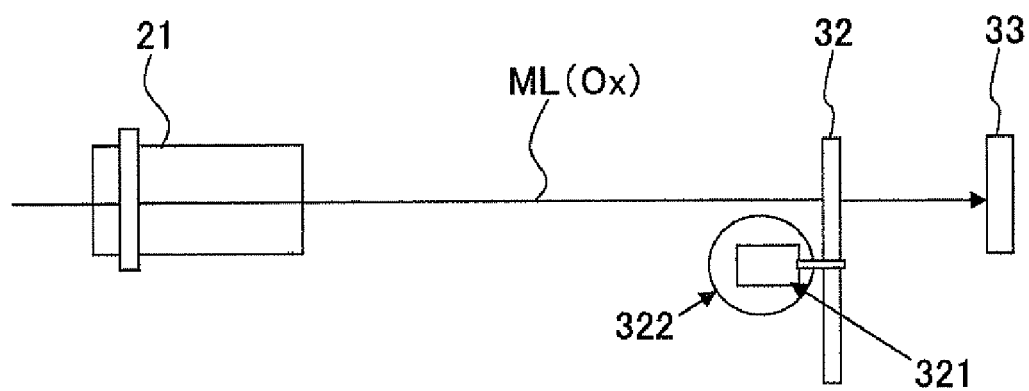
FIGS. 3A and 3B show situations in which the tilt angle is switched or changed over.
Figure 3B:
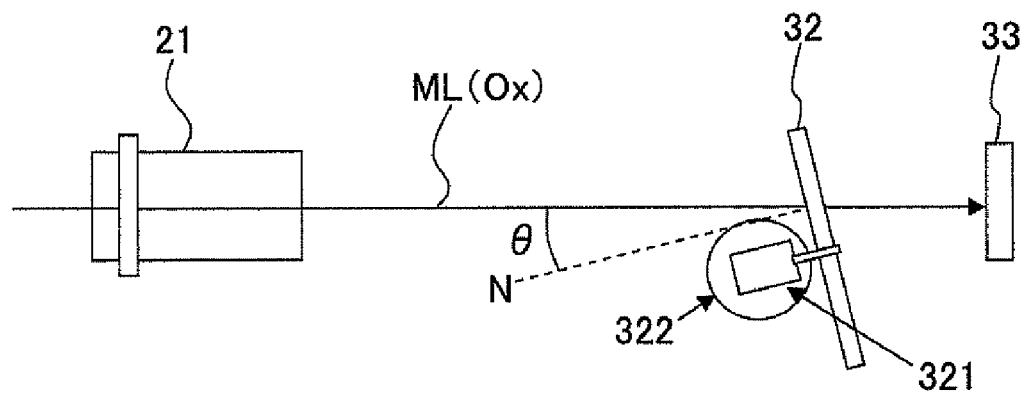

For example, in FIG. 3A, the filter surface of the color matching function filter 32x is arranged perpendicularly to the optical axis Ox of the measuring lens 21. When the rotary shaft S2 is rotated by an angle θ as shown in FIG. 3B, an angle (hereinafter appropriately referred to as "tilt angle"), which is formed by a normal line N of the filter surface of the color matching function filter and the optical axis Ox of the measuring lens 21, is also changed by θ. The stepping motor 322 is referred to as "tilting motor 322".

Next, the x-filter 32x, the y-filter 32y, and the z-filter 32z will be explained in detail.

Figure 15:
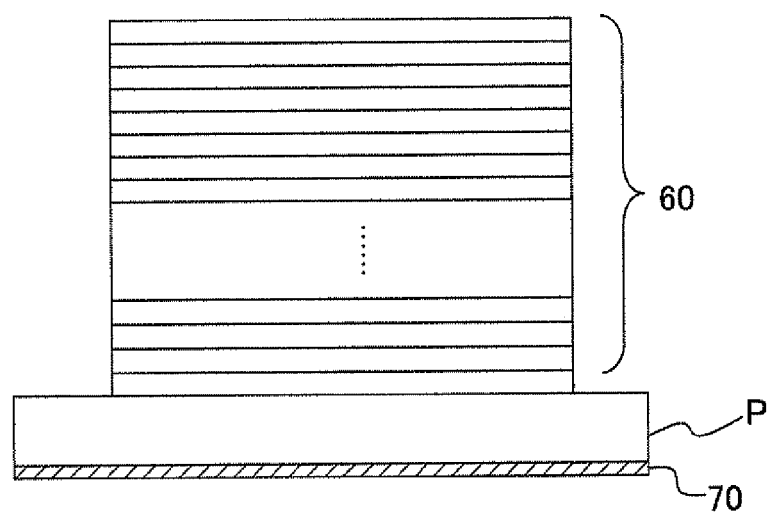
FIG. 15 shows a sectional view illustrating a structure of a filter 32 of the color distribution measuring apparatus of the first embodiment.

As shown in FIG. 15, each of the x-filter 32x, the y-filter 32y, and the z-filter 32z is an optical multilayer film filter constructed by forming an optical multilayer film 60 on one surface of a glass substrate P. For example, an antireflection film 70 is formed on the other surface of the glass substrate P. The film design of the optical multilayer film of the x-filter 32x, the film design of the optical multilayer film of the y-filter 32y, and the film design of the optical multilayer film of the z-filter 32z are performed under the following conditions respectively. Any one of the terms of the "spectral transmission characteristic of the color matching function filter" and the "spectral transmission characteristic of the optical multilayer film" referred to below indicates the spectral sensitivity characteristic of the entire optical system constructed of the color matching function filter and the image pickup element 33.

(1) Condition for Optical Multilayer Film of x-Filter 32x

Thin film substances constructing the optical multilayer film 60(x) are those of two types of niobium pentaoxide ($Nb_2O_5$) and silicon oxide ($SiO_2$).

The film thickness of the optical multilayer film 60(x) is about 4 μm.

Figure 4:
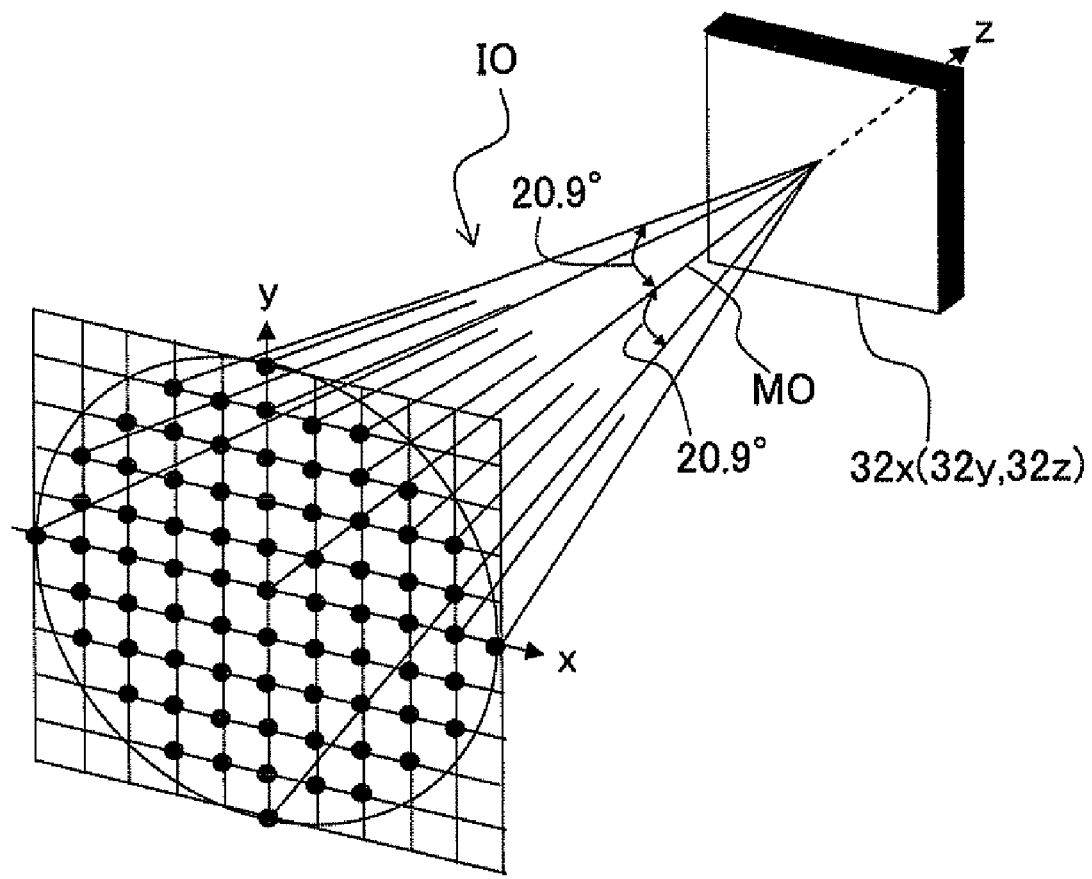
FIG. 4 illustrates an incident light flux assumed upon the film design.

The light, which comes into the optical multilayer film, is telecentric as described above. However, the incident light flux (light flux of those of the same type) IO including the main light beam is the collective or focusing light flux at the center of which the main light beam MO is disposed as shown in FIG. 4, which is assumed to be such a collective light flux that the angle of incidence of the center light beam (main light beam MO) is 0° and the half angle is 20.9°.

The average value of the spectral transmission characteristics with respect to each of seventy-three light beams included in the incident light flux IO at equal intervals (see FIG. 4) is regarded as the spectral transmission characteristic of the optical multilayer film.

The target curve shape of the spectral transmission characteristic of the optical multilayer film 60 is same as the curve shape of the X component (X(λ)) of the color matching function of the CIE-XYZ color system.

(2) Condition for Optical Multilayer Film of y-Filter 32y

Thin film substances constructing the optical multilayer film 60(y) are those of two types of niobium pentaoxide (Nb$_2$O$_5$) and silicon oxide (SiO$_2$).

The film thickness of the optical multilayer film 60(y) is about 4 μm.

It is assumed that the incident light flux IO, which comes into the optical multilayer film 60(y), is such a collective light flux that the angle of incidence of the center light beam (main light beam MO) is 0° and the half angle is 20.9° (see FIG. 4).

The average value of the spectral transmission characteristics with respect to each of seventy-three light beams included in the incident light flux IO at equal intervals (see FIG. 4) is regarded as the spectral transmission characteristic of the optical multilayer film 60(y).

The target curve shape of the spectral transmission characteristic of the optical multilayer film is same as the curve shape of the Y component (Y(λ)) of the color matching function of the CIE-XYZ color system.

(3) Condition for Optical Multilayer Film of z-Filter 32z

Thin film substances constructing the optical multilayer film 60(z) are those of two types of niobium pentaoxide (Nb$_2$O$_5$) and silicon oxide (SiO$_2$).

The film thickness of the optical multilayer film 60(z) is about 4 μm.

It is assumed that the incident light flux IO, which comes into the optical multilayer film 60(z), is such a collective light flux that the angle of incidence of the center light beam (main light beam MO) is 0° and the half angle is 20.9° (see FIG. 4).

The average value of the spectral transmission characteristics with respect to each of seventy-three light beams included in the incident light flux at equal intervals (see FIG. 4) is regarded as the spectral transmission characteristic of the optical multilayer film 60(z).

The target curve shape of the spectral transmission characteristic of the optical multilayer film is same as the curve shape of the Z component (Z(λ)) of the color matching function of the CIE-XYZ color system.

The incident light flux 10 (see FIG. 4), which is referred to under the conditions described above, is provided as a model of the collective light flux coming into the respective points of the color matching function filter when the tilt angle of the color matching function filter is 0° and the F value of the measuring lens 21 is the open F value (F 1.4 in this case).

Therefore, the film design of the optical multilayer film described above is performed so that the spectral transmission characteristic of the color matching function filter is the ideal characteristic when the tilt angle is 0° and the F value is the minimum value.

As a result of the film design, for example, the film constructions are obtained as shown in FIGS. 5, 6, and 7. FIG. 5 shows the film construction of the optical multilayer film of the x-filter 32x. FIG. 6 shows the film construction of the optical multilayer film of the y-filter 32y. FIG. 7 shows the film construction of the optical multilayer film of the z-filter 32z. The term "No." shown in FIGS. 5, 6, and 7 represents the number or order of the layer as counted from the glass substrate, the term "material" represents the material of each of the layers, and the term "d" represents the physical thickness of each of the layers.

Next, the spectral transmission characteristics of the color matching function filters (x-filter 32x, y-filter 32y, z-filter 32z) will be explained in detail.

Figure 8A:
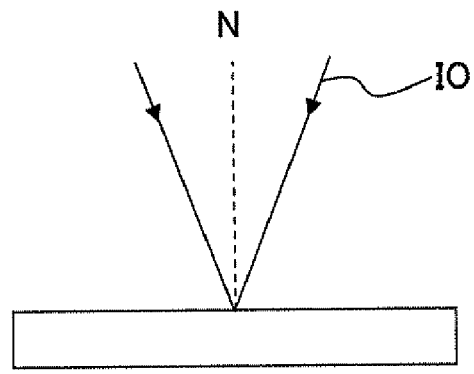
FIGS. 8A, 8B, and, 8C show states of a collective light flux coming into each of points of the color matching function filter when the tilt angle is 0°.
Figure 8B:
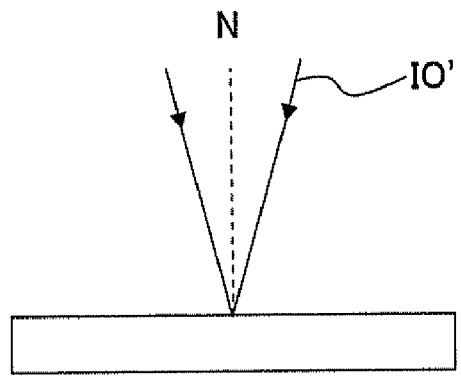
Figure 8C:
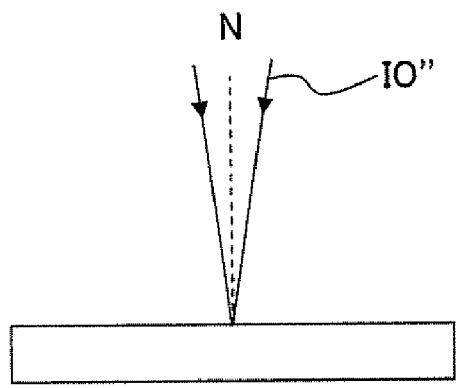

FIG. 8 (FIGS. 8A to 8C) shows the states of the collective light flux coming into each of the points of the color matching function filter when the tilt angle is 0°. The symbol "N" shown in FIG. 8 indicates the normal line of the filter surface. The angle, which is formed by the normal line N and each of the light beams, is the angle of incidence of each of the light beams.

Figure 9A:
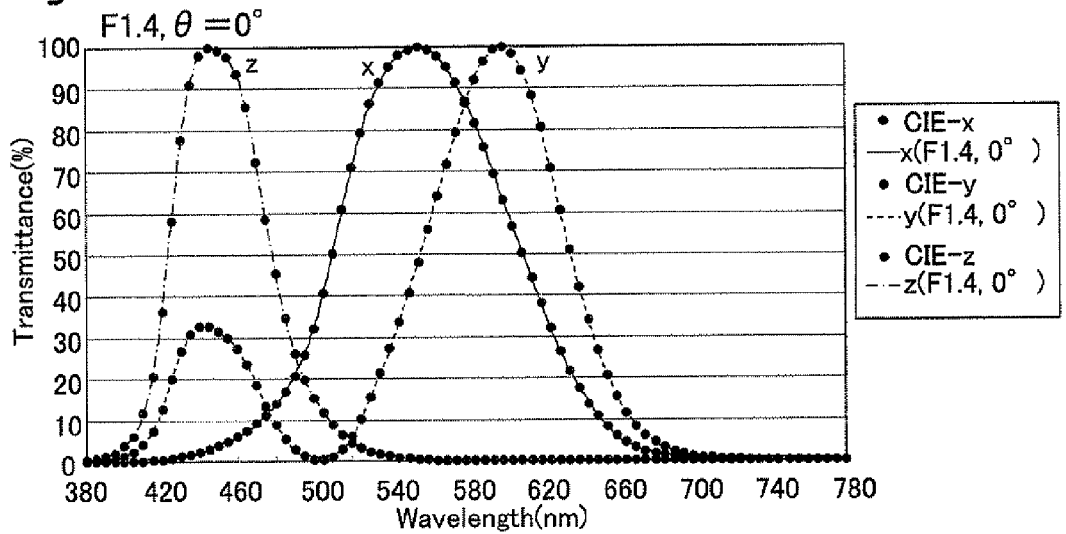
FIGS. 9A, 9B, and 9C show shapes of curves of the spectral transmission characteristics of the color matching function filters when the tilt angle is 0°.
Figure 9B:
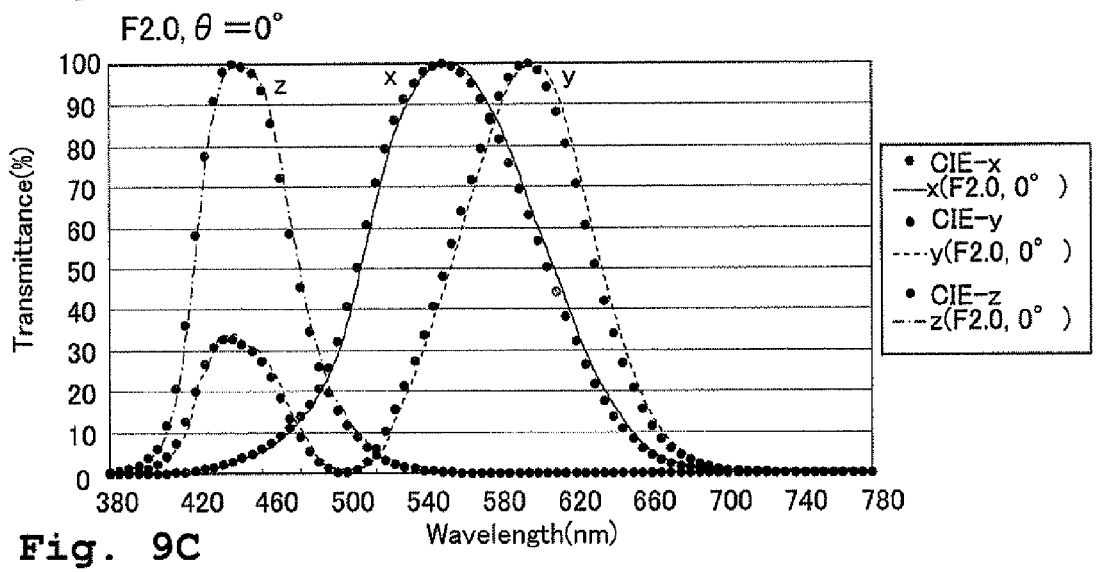
Figure 9C:
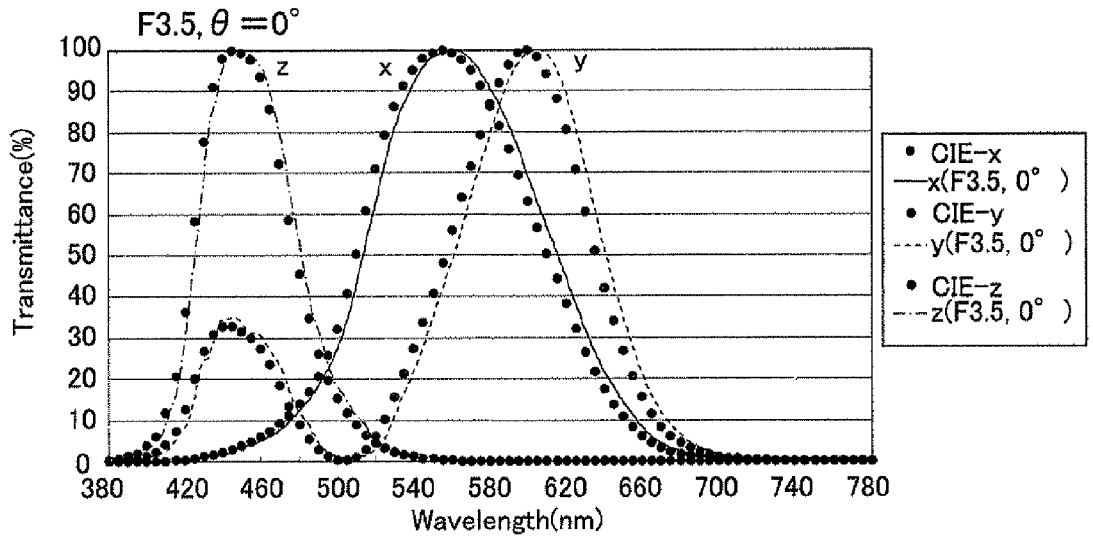

FIG. 9 (FIGS. 9A to 9C) shows the shapes of curves of the spectral transmission characteristics of the color matching function filters when the tilt angle is 0°. The solid lines shown in FIG. 9 represent the curve shapes of the spectral transmission characteristics of the color matching function filters, and the black dots represent the curve shapes of the CIE-XYZ color matching functions. The spectral transmission characteristic of the color matching function filter is the average value of the spectral transmission characteristics with respect to the respective light beams included in the collective light flux.

At first, FIG. 8A shows a state in which the F value is F 1.4. The collective light flux IO in this state is same as the incident light flux IO assumed upon the film design (see FIG. 4). Therefore, the curve shape of the spectral transmission characteristic of the color matching function filter is substantially coincident with the curve shape of the CIE-XYZ color matching function as shown in FIG. 9A.

On the other hand, FIG. 8B shows a state in which the F value is F 2.0. A collective light flux IO' in this state is different from the incident light flux IO assumed upon the film design (see FIG. 8A). Therefore, the curve shape of the spectral transmission characteristic of the color matching function filter is deviated from the curve shape of the CIE-XYZ color matching function as shown in FIG. 9B. Specifically, the spread angle of the collective light flux shown in FIG. 8B is smaller than the spread angle of the incident light flux assumed upon the film design (FIG. 8A). Therefore, the curve shape of the spectral transmission characteristic of the color matching function filter is deviated toward the long wavelength side as compared with the curve shape of the CIE-XYZ color matching function.

The reason thereof is as follows. In general, the light beam, which has a large angle of incidence, tends to shift the curve shape of the spectral transmission characteristic of the color matching function filter toward the short wavelength side. Therefore, when a case that the incident light flux, which contains a large amount of light beams having large angles of incidence, is assumed, the optimization of the film design exerts the action in the direction to shift or deviate the curves of the spectral transmission characteristics with respect to light beams having small angles of incidence toward the long wavelength side so that the amount of wavelength shift, which is brought about by the light beams having large angles of incidence, is offset or counteracted. Therefore, if the amount of the light beams having large angles of incidence is smaller than the assumed amount when the color matching function filter obtained by the film design is used, then the curve shape of the spectral transmission characteristic is shifted toward the long wavelength side.

Further, FIG. 8C shows a state in which the F value is F 3.5. The spread angle of a collective light flux IO" in this state is greatly smaller than the spread angle of the incident light flux assumed upon the film design (see FIG. 8A) (in other words, the amount of the light beams having large angles of incidence is decreased). Therefore, the curve shape of the spectral transmission characteristic of the color matching function filter is greatly deviated toward the long wavelength side as compared with the curve shape of the CIE-XYZ color matching function as shown in FIG. 9C.

As a result of the above, it is appreciated that the spectral transmission characteristic of the color matching function filter is deviated from the ideal characteristic if the F value is changed to any value other than the open F value when the tilt angle is 0°. Accordingly, CPU 40 of this embodiment monitors the F value of the measuring lens 21, and the tilt angle is switched depending on the F value.

Figure 10:
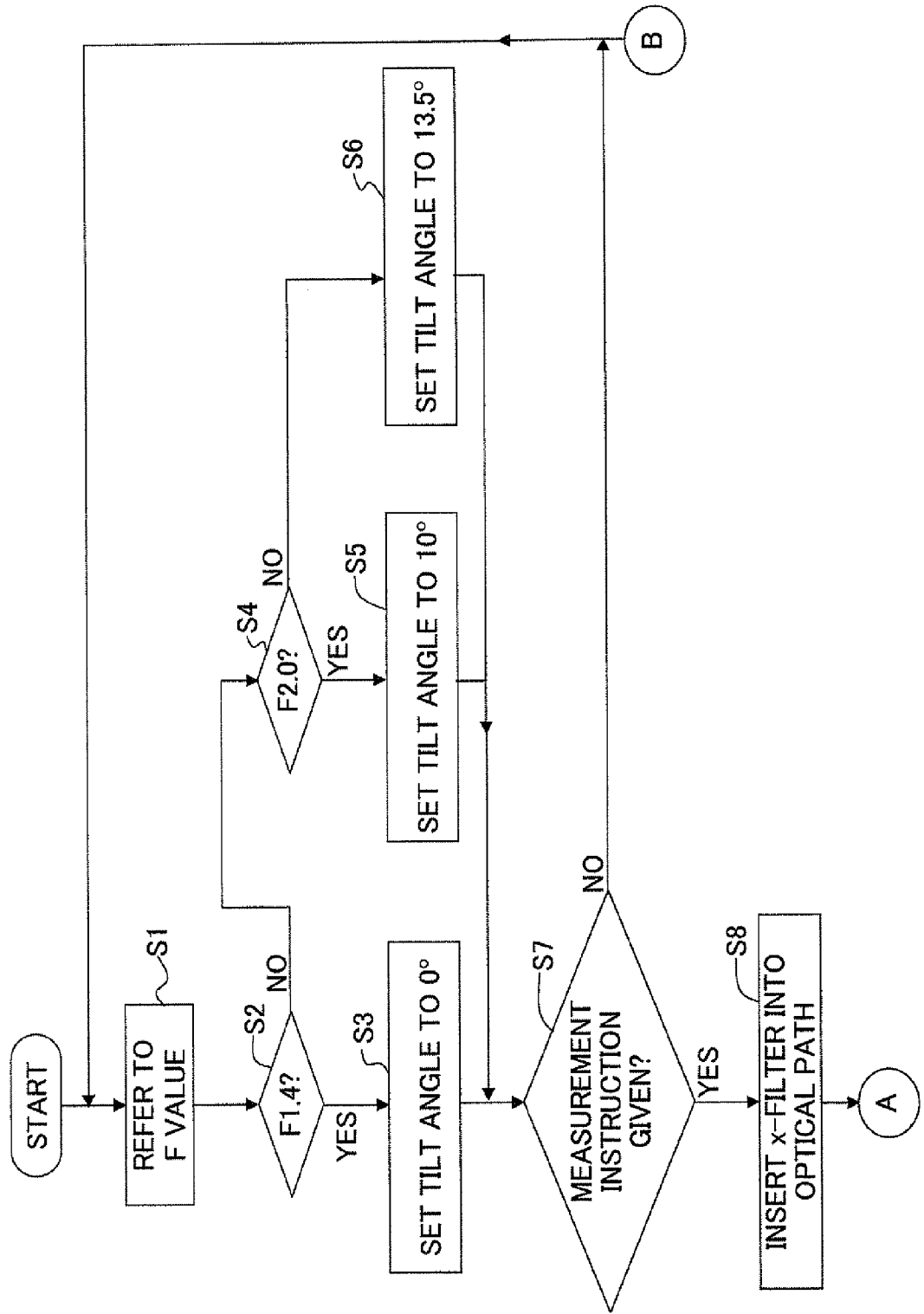
FIG. 10 shows an operation flow chart of CPU 40.
Figure 11:
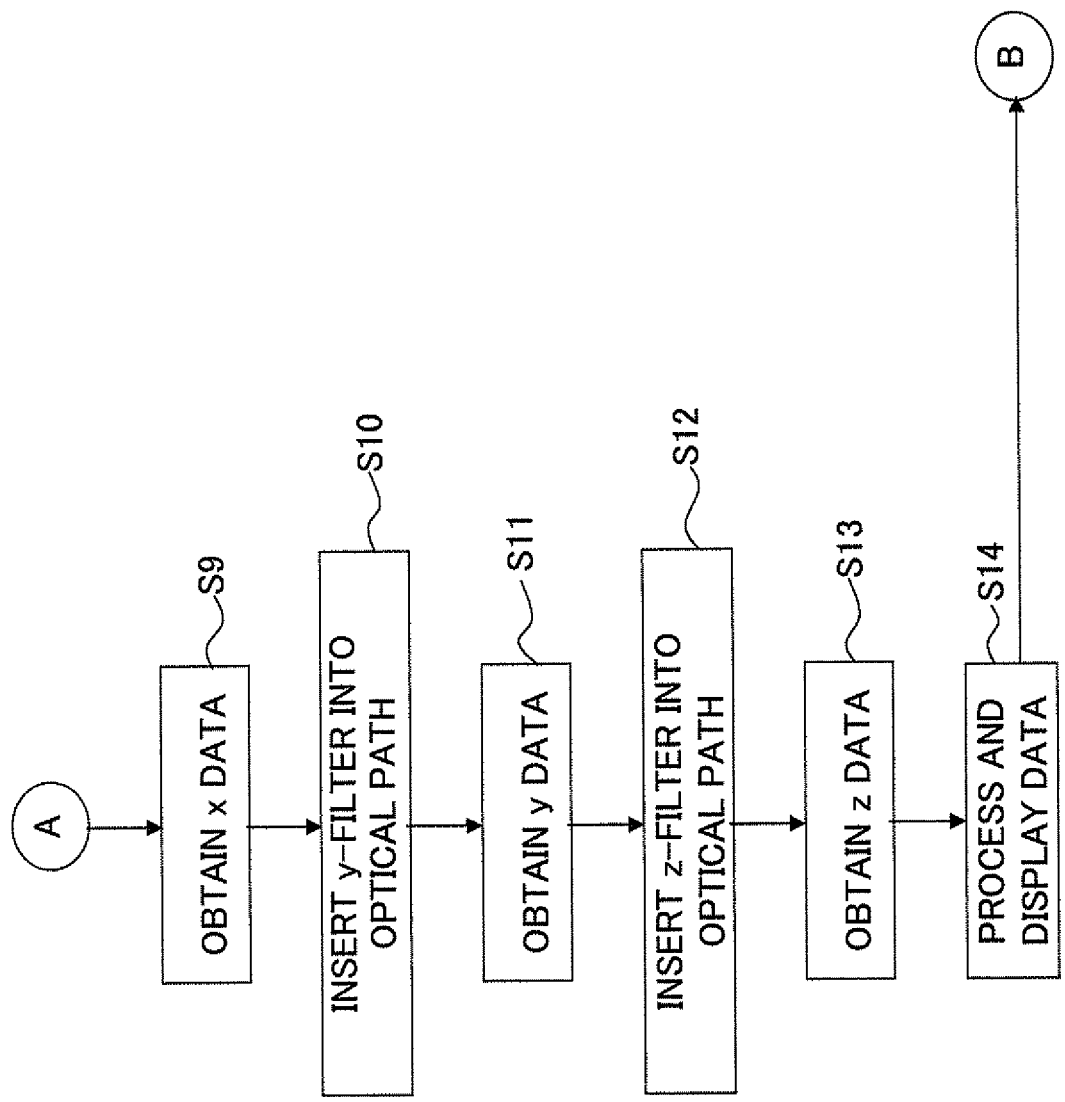
FIG. 11 shows an operation flow chart of CPU 40 continued from FIG. 10.

Next, the operation of CPU 40 will be explained in detail. FIGS. 10 and 11 show an operation flow chart of CPU 40. It is assumed that the y-filter 32y shown in FIG. 2 is inserted into the optical path of the measuring lens 21 shown in FIG. 1, and a monochrome or black and white animation image (moving image, motion image) of the measurement objective is displayed in real-time on the monitor 38 at the point in times of the start of the operation flow chart. In order to effect the displaying, CPU 40 continuously drives the image pickup element 32 to continuously obtain the image signals. The obtained image signals are fed via the amplifier 34 and the A/D conversion circuit 35 to the monitor 38 successively in an order of acquisition. When the user regulates or adjusts the positional relationship between the measurement objective and the color distribution measuring apparatus and/or the position of rotational movement of the diaphragm ring 23 while observing the image of the measurement objective displayed on the monitor 38 in this situation, the user operates the switch 39 to input the measurement instruction to the apparatus body 3. An explanation will be successively made below about the respective steps shown in FIGS. 10 and 11.

Step S1: CPU 40 detects the present F value of the measuring lens 21 via the electrical contact 4.

Step S2: CPU 40 distinguishes whether or not the detected F value is the open F value (F 1.4). If the detected F value is F 1.4, the routine proceeds to Step S3. If the detected F value is not F 1.4, the routine proceeds to Step S4.

Step S3: CPU 40 applies the driving signal to the tilting motor 322 to set the tilt angle of the color matching function filter to 0°. That is, if the F value is the open F value, the tilt angle is set to 0°.

Step S4: CPU 40 distinguishes whether or not the detected F value is F 2.0. If the detected F value is F 2.0, the routine proceeds to Step S5. If the detected F value is not F 2.0, the routine proceeds to Step S6.

Step S5: CPU 40 applies the driving signal to the tilting motor 322 to set the tilt angle of the color matching function filter to 10°. That is, if the F value is F 2.0, the tilt angle is set to 10°.

Step S6: CPU 40 applies the driving signal to the tilting motor 322 to set the tilt angle of the color matching function filter to 13.5°. That is, if the F value is F 3.5, the tilt angle is set to 13.5°.

Step S7: CPU 40 refers to the signal fed from the switch 39 to distinguish whether or not the measurement instruction is inputted by the user. If the measurement instruction is inputted, the routine proceeds to Step S8. If the measurement instruction is not inputted, the routine proceeds to Step S1.

Step S8: CPU 40 applies, to the switching motor 321, the driving signal to set the x-filter 32x for the color matching function filter. The switching motor 321 inserts the x-filter 32x into the optical path of the measuring lens 21. After that, the routine proceeds to Step S9.

Step S9: CPU 40 drives the image pickup element 32 and the amplifier 34 to obtain the image signal of the image imaged on the image pickup element 32 via the x-filter 32x, and the routine proceeds to Step S10. The image signal is converted by the A/D conversion circuit 35 into a digital data (x data) which is incorporated into the image memory 36.

Step S10: CPU 40 applies, to the switching motor 321, the driving signal to set the y-filter 32y for the color matching function filter. The switching motor 321 inserts the y-filter 32y into the optical path of the measuring lens 21. Subsequently, the routine proceeds to Step S11.

Step S11: CPU 40 drives the image pickup element 32 and the amplifier 34 to obtain the image signal of the image imaged on the image pickup element 32 via the y-filter 32y, and the routine proceeds to Step S12. The obtained image signal is converted by the A/D conversion circuit 35 into a digital data (y data) which is incorporated into the image memory 36.

Step S12: CPU 40 applies, to the switching motor 321, the driving signal to set the z-filter 32z for the color matching function filter. The switching motor 321 inserts the z-filter 32z into the optical path of the measuring lens 21. After that, the routine proceeds to Step S13.

Step S13: CPU 40 drives the image pickup element 32 and the amplifier 34 to obtain the image signal of the image imaged on the image pickup element 32 via the z-filter 32z, and the routine proceeds to Step S14. The obtained image signal is converted by the A/D conversion circuit 35 into a digital data (z data) which is incorporated into the image memory 36.

Step S14: CPU 40 drives the data processing circuit 37, and the routine proceeds to Step S1. The data processing circuit 37 calculates the tristimulus values of the respective points of the image of the measurement objective based on the x data, the y data, and the z data accumulated in the image memory. Accordingly, the color distribution data of the measurement objective is obtained. The color distribution data calculated by the data processing circuit 37 is displayed on the monitor 30. The tristimulus values calculated in this process are the tristimulus values of the normalized color system, which include, for example, the tristimulus values (X, Y, Z) of the CIE-XYZ color system.

As described above, CPU 40 of this embodiment sets the tilt angle to 0° when the F value is F 1.4. CPU 40 of this embodiment sets the tilt angle to 10° when the F value is F 2.0. CPU 40 of this embodiment sets the tilt angle to 13.5° when the F value is F 3.5. An explanation will be made with reference to FIGS. 12 and 13 about the effect brought about by changing the tilt angle depending on the F value as described above.

Figure 12A:
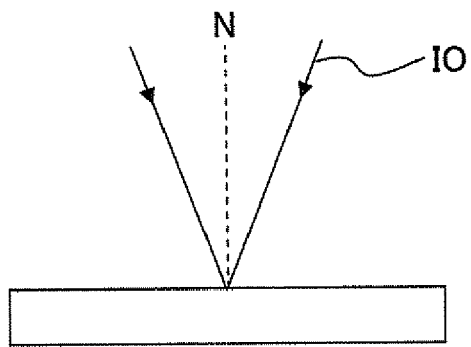
FIGS. 12A, 12B, and 12C show states of a collective light flux in a first embodiment.
Figure 12B:
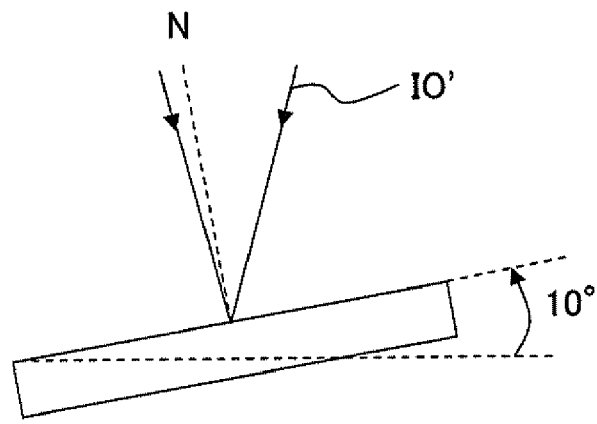
Figure 12C:
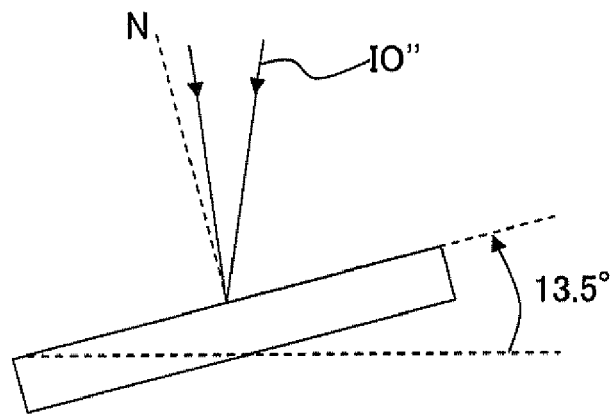
Figure 13A:
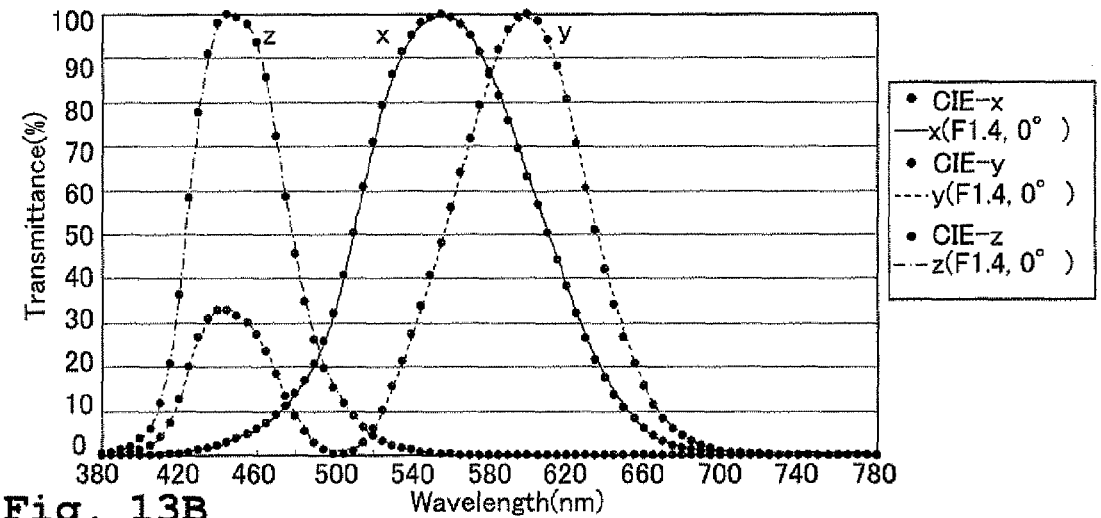
FIGS. 13A, 13B, and 13C show shapes of curves of the spectral transmission characteristics of the color matching function filters in the first embodiment.

FIG. 12 (FIGS. 12A to 12C) shows the states of the collective light flux in this embodiment. The symbol "N" shown in FIG. 12 indicates the normal line of the filter surface. FIG. 13 shows the shapes of curves of the spectral transmission characteristics of the color matching function filters in this embodiment. The depicting method of FIG. 13 is same as that of FIG. 9.

At first, FIG. 12A shows the state in which the F value is F 1.4. In this situation, the tilt angle of the color matching function filter is set to 0°. The collective light flux IO in this state is coincident with the incident light flux IO assumed upon the film design. Therefore, the curve shape of the spectral transmission characteristic of the color matching function filter is coincident with the curve shape of the CIE-XYZ color matching function as shown by the solid line in FIG. 13A.

Figure 13B:
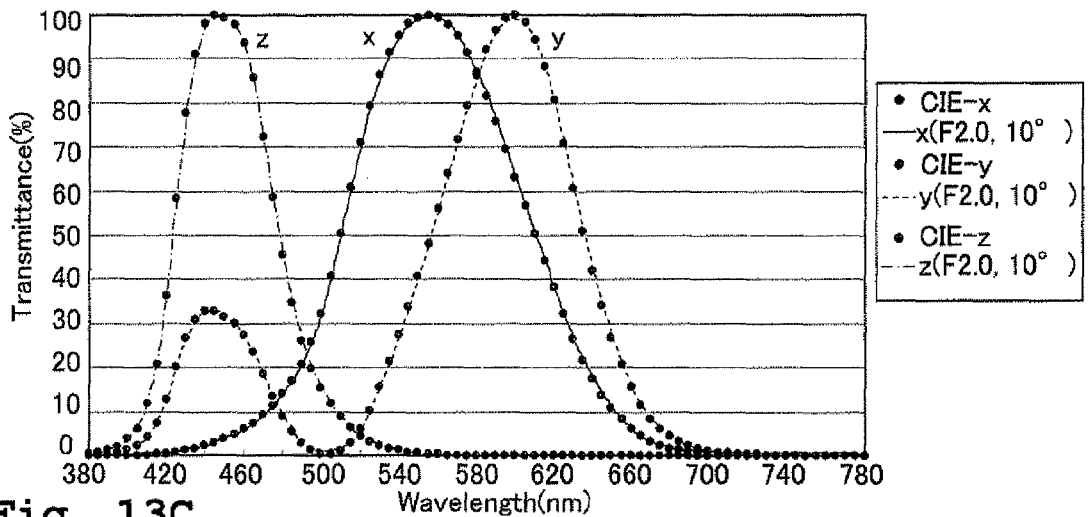

On the other hand, FIG. 12B shows the state in which the F value is F 2.0. In this situation, the tilt angle is set to 10°. The spread angle of the collective light flux IO' in this state is smaller than the spread angle of the incident light flux assumed upon the film design (FIG. 12A). However, the amount of the light beams having large angles of incidence is larger than the amount of those shown in FIG. 8B, because the tilt angle is set to 10°. Therefore, the curve shape of the spectral transmission characteristic of the color matching function filter is substantially coincident with the curve shape of the CIE-XYZ color matching function as shown in FIG. 13B.

In this case, the attention is focused on only the amount of the light beams having large angles of incidence. However, actually, as clarified from the comparison between FIG. 12B and FIG. 8B, the amount of the light beams having small angles of incidence is decreased corresponding to the extent of the increase in the amount of the light beams having large angles of incidence. Therefore, when the attention is focused on the amount of the light beams having large angles of incidence, it is possible to explain the variation or fluctuation of the spectral transmission characteristic of the color matching function filter.

Figure 13C:
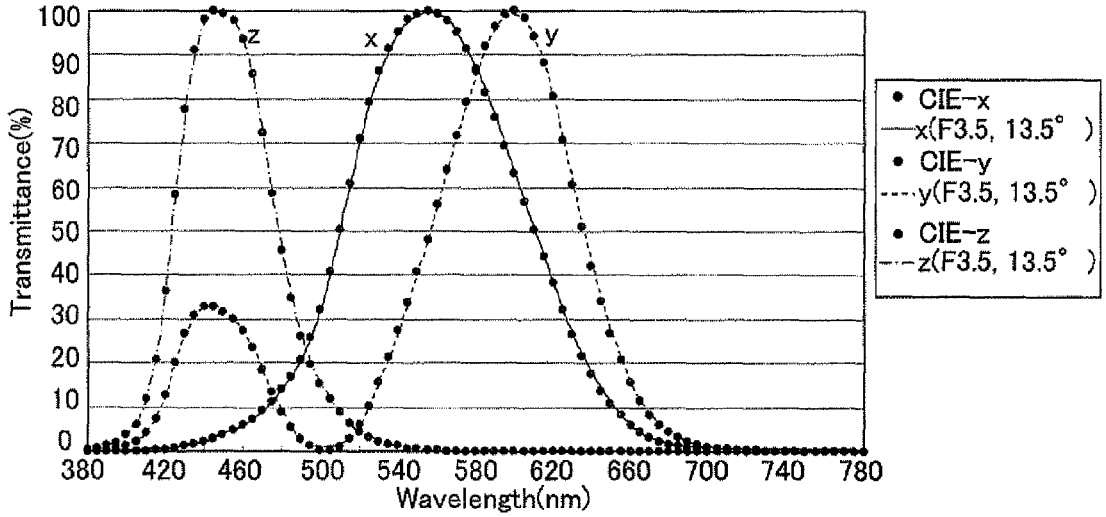

Further, FIG. 12C shows the state in which the F value is F 3.5. In this situation, the tilt angle is set to 13.5°. The spread angle of the collective light flux IO" in this state is greatly smaller than the spread angle of the incident light flux assumed upon the film design (see FIG. 12A). However, the amount of the light beams having large angles of incidence is greatly larger than the amount of those shown in FIG. 8C, because the tilt angle is set to 13.5°. Therefore, the curve shape of the spectral transmission characteristic of the color matching function filter is coincident with the curve shape of the CIE-XYZ color matching function as shown in FIG. 13C.

As described above, in the color distribution measuring apparatus of this embodiment, the diameter of the aperture diaphragm of the measuring lens 21 is variable, and the optical multilayer film is used for the color matching function filter. However, CPU 40 of this embodiment sets the larger tilt angle of the color matching function filter when the spread angle of the collective light flux coming into the color matching function filter is smaller. By doing so, the spectral transmission characteristic of the color matching function filter is maintained to be the ideal characteristic. Therefore, according to the color distribution measuring apparatus of this embodiment, it is possible to measure the color distribution of each of the measurement objectives highly accurately even when the F value of the optical system, which is most suitable for the measurement of the color distribution of each of the measurement objectives, is selected depending on a variety of the measurement objectives.

In the color distribution measuring apparatus of this embodiment, the measuring optical system 21 is telecentric on the image side. Therefore, the collective light flux (or the main light beam thereof) comes at the same angle of incidence into each of the positions of the color matching function filter. Therefore, the effect, which is brought about by the change of the tilt angle, appears uniformly at the respective points on the color matching function filter. Therefore, the color distribution measuring apparatus of this embodiment makes it possible to always measure the color of each point of the measurement objective at a uniform accuracy.

The optical multilayer film of the color matching function filter of this embodiment is designed so that the spectral transmission characteristic is the ideal characteristic when the tilt angle of the color matching function filter is 0° and the F value of the measuring lens 21 is the minimum (the image side numerical aperture is the maximum). Therefore, even when the F value of the measuring lens 21 is changed, the spread angle of the collective light flux is changed in only such a way that the spread angle is decreased as compared with the angle assumed upon the film design. Therefore, the color distribution measuring apparatus of this embodiment can deal with all of the F values of the measuring lenses 21.

Second Embodiment

A second embodiment of a color distribution measuring apparatus will be explained below. This embodiment is a modified embodiment of the first embodiment. Only the difference from the first embodiment will be explained herein.

Figure 14A:
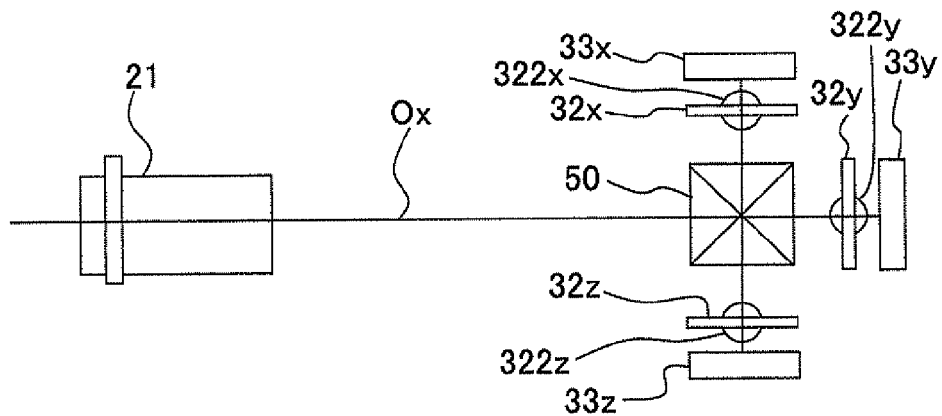
FIGS. 14A and 14B show a construction of those disposed in the vicinity of image pickup elements or devices of a color distribution measuring apparatus of a second embodiment.
Figure 14B:
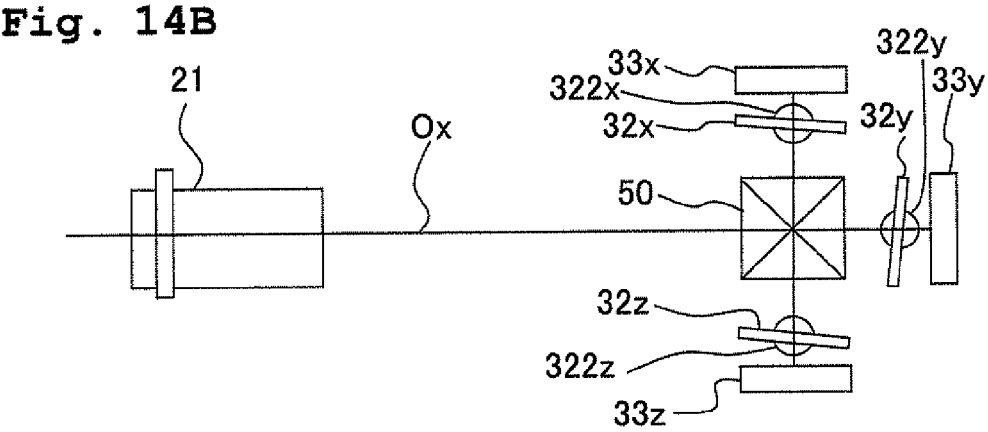

FIG. 14 (FIGS. 14A and 14B) shows the construction of those disposed in the vicinity of image pickup elements of a color distribution measuring apparatus of this embodiment. As shown in FIG. 14A, the optical system of the color distribution measuring apparatus of this embodiment is constructed in accordance with the three-plate system, rather than in accordance with the single plate system.

That is, the color distribution measuring apparatus of this embodiment is provided with a beam splitter 50, three image pickup elements 33x, 33y, 33z, and three tiling motors 322x, 322y, 322z. The turret 32 and the switching motor 321 are omitted therefrom.

The imaging light flux exiting from the measuring lens 21 is branched into three imaging light fluxes by the beam splitter 50.

A certain imaging light flux, which has been branched, passes through the x-filter 32x, and the imaging light flux comes into the image pickup element 33x. The imaging light flux forms an image of the measurement objective on the image pickup element 33x.

Another imaging light flux, which has been branched, passes through the y-filter 32y, and the imaging light flux comes into the image pickup element 33y. The imaging light flux forms an image of the measurement objective on the image pickup element 33y.

Still another imaging light flux, which has been branched, passes through the z-filter 32z, and the imaging light flux comes into the image pickup element 33z. The imaging light flux forms an image of the measurement objective on the image pickup element 33z.

The x-filter 32x is rotatably supported by a rotary shaft which is parallel to the filter surface. The tilting motor 322x is connected to the rotary shaft. When the tilting motor 322x is driven, the tilt angle of the x-filter 32x is switched or changed over (from the state shown in FIG. 14A to the state shown in FIG. 14B).

The y-filter 32y is rotatably supported by a rotary shaft which is parallel to the filter surface. The tilting motor 322y is connected to the rotary shaft. When the tilting motor 322y is driven, the tilt angle of the y-filter 32y is switched or changed over (from the state shown in FIG. 14A to the state shown in FIG. 14B).

The z-filter 32z is rotatably supported by a rotary shaft which is parallel to the filter surface. The tilting motor 322z is connected to the rotary shaft. When the tilting motor 322z is driven, the tilt angle of the z-filter 32z is switched or changed over (from the state shown in FIG. 14A to the state shown in FIG. 14B).

Therefore, CPU 40 of this embodiment can simultaneously obtain the x data, the y data, and the z data by simultaneously driving the image pickup elements 33x, 33y, 33z. However, it is necessary for CPU 40 of this embodiment that the tilt angle is switched depending on the F value for each of the x-filter 32x, the y-filter 32y, and the z-filter 32z. In order to switch the tilt angle, it is appropriate that CPU 40 applies the driving signal to each of the tiling motors 322x, 322y, 322z.

Also in the second embodiment, when CPU 40 sets the relationship between the F value and the tilt angle in the same manner as in the first embodiment, it is possible to obtain the same effect as that of the first embodiment.

In the embodiments described above, the number of changeovers of the F value of the measuring lens is three. However, the number may be any plural other than three. In such a case, ROM 41 previously stores the information about the tilt angles suitable for the respective F values which may be set for the measuring lens 21.

In the embodiments described above, the F value of the measuring lens is switched in the stepwise manner. However, the F value of the measuring lens may be switched continuously. In this case, the information about the corresponding relationship between the F value and the tilt angle may be stored as a calculation expression.

The apparatus body 3 of each of the embodiments described above deals with the changeover of the F value of the measuring lens 21. However, it is desirable to deal with such a case that the lens unit 2 is exchanged for another lens unit. In this case, the optical multilayer film of the color matching function filter is designed while assuming a collective light flux having the largest spread angle (collective light flux provided when the open F value is minimum) among the collective light fluxes which may be allowed to come into the color matching function filter.

In this case, it is desirable that any measuring lens of the lens unit which may be installed to the apparatus body 3 is telecentric on the image side.

In a case that all of a plurality of measuring lenses which may be installed to the apparatus body 3 are lenses having invariable F values, then the apparatus body 3 may detect the type of the installed measuring lens, instead of the direct detection of the F value of the installed measuring lens, and the F value of the measuring lens may be indirectly detected thereby. However, in such a case, it is assumed that the apparatus body 3 previously stores the information about the F values of the various measuring lenses.

In the embodiments described above, the entire measuring lens is exchangeable. However, it is also allowable that only a part of the measuring lens is exchangeable. In such a case, a lens group, which is disposed on the objective side with respect to the diaphragm surface, may be provided as a lens unit which is exchangeable. On condition that the diaphragm surface is not displaced before and after the exchange, the telecentricity on the image side of the measuring lens is maintained.

In the embodiments described above, CPU 40 automatically detects the F value of the measuring lens. However, the F value of the measuring lens may be inputted by the user. In this case, the tilt angle of the color matching function filter may be switched mechanically, and the switch via which the user inputs the F value may be operated mechanically. Further, a mechanism, which is provided to change the tilt angle of the color matching function filter, may be connected to the switch. In this way, it is unnecessary to provide the tilting motor. The measuring apparatus may be modified as follows, instead of the automatic detection of the F value of the measuring lens by CPU 40. That is, the rotational movement of the diaphragm ring 23 and the rotation of the tilting motor 322 are linked with each other mechanically or electrically, and it is possible to change the tilt angle directly in accordance with the variation of the F value brought about by the rotational movement of the diaphragm ring 23. In this way, it is possible to omit or simplify the control by CPU.

In the embodiment described above, the tilting motor 322 is used as the device for regulating the tilt angle or the device for changing the tilt angle so that the angle of the turret 32 is inclined with respect to the optical axis Ox of the measuring lens 21. However, it is allowable to use any arbitrary mechanism, provided that the mechanism is capable of inclining the surface angles of the x-filter 32x, the y-filter 32y, and the z-filter 32z with respect to the optical axis Ox of the measuring lens 21. For example, the x-filter 32x, the y-filter 32y, and the z-filter 32z may be embedded successively or sequentially in a lengthy plate in the longitudinal direction of the plate, and the plate may be moved in the longitudinal direction with respect to the optical axis Ox of the imaging optical system (measuring lens 21). By doing so, it is possible to switch or change over the filters. The angle of inclination of the plate with respect to the optical axis Ox of the imaging optical system (measuring lens 21) can be regulated by moving one end of the plate by an actuator such as a PZT element or the like. In the embodiment described above, the angle of the turret 32 is inclined with respect to the optical axis Ox of the measuring lens 21 by using the tilting motor 322. However, the optical axis Ox of the measuring lens 21 and the orientation of the image pickup element 33 may be changed with respect to the turret 32.

In the embodiment described above, the F value of the measuring lens 21 is changed by regulating the position of rotational movement of the diaphragm ring 23. However, the measuring lens 21 may be exchanged with a measuring lens having a different F value. That is, the imaging optical system usable in the present invention is exchangeable. It is also allowable that the color distribution measuring optical system of the present invention is not provided with the imaging optical system. The user obtaining the color distribution measuring optical system of the present invention may use any commercially available imaging optical system or any imaging optical system used in any other optical instrument in combination with the color distribution measuring optical system.

In the embodiments described above, the color matching function filter is used, which has the optical multilayer film composed of the specified materials and having the specified layer construction. However, it is possible to change the materials and the layer construction depending on the measurement objective and the wavelength of the measuring light.

The color distribution measuring optical system and the color distribution measuring apparatus of the present invention make it possible to provide the constant spectral transmission characteristic of the optical multilayer film even when the imaging optical system or the numerical aperture thereof is changed. Therefore, it is possible to measure the color distributions of various measurement objectives easily and correctly.

What is claimed is:

1. A color distribution measuring optical system which measures a color distribution of a measurement objective via an imaging optical system, the color distribution measuring optical system comprising:
   a color matching function filter which is an optical multilayer film filter; and
   a changing device which changes an angle of arrangement of the color matching function filter with respect to an optical axis of the imaging optical system,
   wherein the changing device changes the angle of arrangement of the color matching function filter depending on an image side numerical aperture of the imaging optical system.

2. The color distribution measuring optical system according to claim 1, wherein the changing device changes the angle of arrangement of the color matching function filter in response to an instruction from an user.

3. The color distribution measuring optical system according to claim 1, wherein the imaging optical system is an optical system which is telecentric on an image side.

4. The color distribution measuring optical system according to claim 1, wherein the color matching function filter is designed so that a spectral transmission characteristic of a CIE color matching function curve is obtained when an angle, which is formed by the optical axis of the imaging optical system and a normal line of the color matching function filter, is 0° and an image side numerical aperture of the imaging optical system is maximum.

5. The color distribution measuring optical system according to claim 1, further comprising the imaging optical system.

6. A color distribution measuring apparatus comprising:
the color distribution measuring optical system as defined in claim 1; and
a signal generating device which generates color distribution data of the measurement objective based on a luminance distribution of an image generated by the color distribution measuring optical system.

7. A color distribution measuring apparatus which measures a color distribution of an objective, the color distribution measuring apparatus comprising:
an imaging optical system;
a color matching function filter which has an optical multilayer film;
a tilt angle regulating device which regulates a tilt angle of the optical multilayer film with respect to an optical axis of the imaging optical system;
a first detector which detects an image formed via the imaging optical system and the color matching function filter;
an aperture diaphragm which regulates an image side numerical aperture of the imaging optical system; and
a second detector which detects the image side numerical aperture,
wherein the tilt angle regulating device regulates the tilt angle based on the image side numerical aperture detected by the detector.

8. The color distribution measuring apparatus according to claim 7, wherein the tilt angle regulating device increases the tilt angle more greatly as the detected image side numerical aperture becomes larger.

9. A color distribution measuring method for measuring a color distribution of a measurement objective based on a luminance distribution of an image of the measurement objective, the color distribution measuring method comprising:
arranging a color matching function filter having an optical multilayer film on an image side of an imaging optical system;
regulating an angle of arrangement of the color matching function filter with respect to an optical axis of the imaging optical system depending on an image side numerical aperture of the imaging optical system; and
detecting an image of the measurement objective via the imaging optical system and the color matching function filter in which the angle of arrangement is regulated.

10. The color distribution measuring method according to claim 9, further comprising detecting the image side numerical aperture of the imaging optical system.

11. The color distribution measuring method according to claim 9, further comprising previously determining the angle of arrangement of the color matching function filter with respect to the optical axis of the imaging optical system in relation to a different value of the image side numerical aperture of the imaging optical system.

12. The color distribution measuring method according to claim 9, further comprising regulating the image side numerical aperture of the imaging optical system depending on the measurement objective.

* * * * *